United States Patent [19]

Sugaya et al.

[11] Patent Number: 5,128,378
[45] Date of Patent: Jul. 7, 1992

[54] CATION EXCHANGER

[75] Inventors: Yoshio Sugaya, Yokohama; Josho Kashiwame, Yamato; Ichiro Terada, Yokohama, all of Japan

[73] Assignee: Asahi Glass Company Ltd., Tokyo, Japan

[21] Appl. No.: 591,810

[22] Filed: Oct. 2, 1990

Related U.S. Application Data

[63] Continuation of Ser. No. 314,134, Feb. 23, 1990, abandoned.

[30] Foreign Application Priority Data

Feb. 25, 1988 [JP] Japan .................................. 63-40719

[51] Int. Cl.⁵ .......................... C08J 5/22; C08F 8/36; C08F 8/24
[52] U.S. Cl. ........................ 521/33; 521/27; 521/30
[58] Field of Search .................. 521/27, 30, 31, 33

[56] References Cited

U.S. PATENT DOCUMENTS 4,797,457  1/1989  Guiver et al. ...................... 528/171

FOREIGN PATENT DOCUMENTS 0061424  3/1982  European Pat. Off. .
2531159  1/1976  Fed. Rep. of Germany .

Primary Examiner—Thurman K. Page
Assistant Examiner—Peter F. Kulkosky
Attorney, Agent, or Firm—Oblon, Spivak, McClelland, Maier & Neustadt

[57] ABSTRACT

A cation exchanger of polysulfone polymer consisting essentially of a sulfonated product of a polysulfone polymer having at least one chloromethyl ($-CH_2Cl$) or mercapto ($-SH$) group per molecule, or a cured product thereof, and having an ion exchange capacity of from 0.5 to 3.5 meq/g dry resin.

6 Claims, No Drawings

CATION EXCHANGER

This is a continuation of Ser. No. 07/314,134, filed Feb. 23, 1990, now abandoned.

The present invention relates to an ion exchanger capable of adsorbing or permselectively separating a certain component from a fluid mixture. More particularly, it relates to a cation exchanger having excellent workability, which is useful, for example, as a thin cation exchange membrane having a low electric resistance useful as a separator for electric cells or for electrodialysis for concentrating sea water, as a hollow fiber type cation exchange membrane useful for dialysis, or as a porous cation exchange membrane providing good permeability for high molecular cations Among cation exchangers reported in many literatures and patent documents, cation exchangers of sulfonated styrene-divinylbenzene copolymers may be mentioned as most practical and useful cation exchangers. Such sulfonated cation exchangers have been developed and various kinds cf products have been synthesized in various fields of applications by virtue of their chemical resistance and heat resistance and their adaptability such that their ion exchange properties and selective permeability can be controlled by changing the content of the divinylbenzene as the cross linking agent.

However, there is a drawback that the conventional styrene-divinylbenzene type cation exchangers can not satisfy the needs for super low resistance cation exchange membranes in new applications such as an application to concentrate sea water to produce sodium chloride at a cost as low as the cost for industrial salt, and an application as a separator for redox flow cells or methanol fuel cells. Namely, in order to reduce the resistance, it is necessary to reduce the membrane thickness. However, the styrene divinylbenzene type resin has a difficulty in the mechanical strength, particularly in brittleness, and it is thereby impossible to obtain an ion exchange membrane having a thickness of not more than 100 μm. Further, the styrene-divinylbenzene type resin is poor not only in the mechanical properties but also in the workability and thus has a drawback that it is thereby difficult to obtain a fabricated membrane such as a hollow fiber membrane or a porous cation exchange membrane.

On the other hand, a polysulfone membrane having excellent mechanical strength and workability is used as a membrane for ultrafiltration or reverse osmosis. A sulfonated polysulfone membrane is being studied for improving the permeability of ultrafiltration or reverse osmosis through the polysulfone membrane.

For example, U.S. Pat. No. 3,709,841 discloses a sulfonated product of a polysulfone having a repeating unit of the formula:

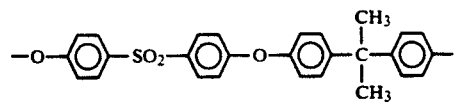

Further, Japanese Unexamined Patent Publications No. 99973/1975, No. 146379/1976 and No. 4505/1986 disclose semipermeable membranes having such a sulfonated polysulfone laminated on an asymmetric ultrafilter.

However, these sulfonated polysulfone membranes are not cross linked and thus are water-soluble when the ion exchange capacity is 2.0 meq/g dry resin or higher. Even when the ion exchange capacity is low, the water absorptivity is high, and the ion permselectivity is low. Thus, they are not qualified as a substitute for the conventional styrene-divinylbenzene type cation exchange membranes.

It is an object of the present invention to solve the above-mentioned drawbacks inherent to the conventional techniques and to provide a novel cation exchanger having excellent workability and high ion permselectivity.

Another object of the present invention is to provide a cation exchange membrane useful for electrodialysis of an energy saving type or useful as a separator for electric cells, or useful for a hollow fiber dialysis module which is compact and convenient for maintenance, which can not be accomplished by the conventional techniques.

The above objects of the present invention can be accomplished by a cation exchanger of polysulfone polymer consisting essentially of a sulfonated product of a polysulfone polymer having at least one chloromethyl (—CH₂Cl) or mercapto (—SH) group per molecule, or a cured product thereof, and having an ion exchange capacity of from 0.5 to 3.5 meq/g dry resin.

Now, the present invention will be described in detail with reference to the preferred embodiments.

In a first embodiment, the present invention provides a cation exchanger made of a sulfonated product of a polysulfone polymer containing at least one mercapto (—SH) group per molecule, or a cured product thereof, and having an ion exchange capacity of from 0.5 to 3.5 meq/g dry resin.

The cation exchanger of this first embodiment of the present invention consists essentially of the above-mentioned specific sulfonated polysulfone polymer or the cured product thereof. Such a cation exchanger is far superior to the conventional cation exchangers in its properties.

Namely, as disclosed in Japanese Unexamined Patent Publication No. 4505/1986, the conventional sulfonated polysulfone polymers are not cross-linked and thus becomes water-soluble polymers when the ion exchange capacity exceeds 2.0 meq/g dry resin, and then they are no longer useful as ion exchangers. As a polysulfone resin having a cure site. a resin having a —OH group or a —C≡CH group at its terminals, is known. However, these cure sites have a low reactivity, and heat treatment at a high temperature of from 320° to 400° C. exceeding the thermal decomposition temperature of the sulfonic acid group, is required. Thus, such a polysulone resin is not suitable as the base material for producing a cross linkable polysulfone ion exchange membrane.

The present inventors have conducted extensive research on cured products of sulfonated polysulfone polymers and have found it possible to produce a cation exchanger having excellent mechanical properties, moldability and ion exchange properties by using a polysulfone polymer containing a mercapto group in the molecule. The present invention has been accomplished on the basis of this discovery.

Now, this first embodiment of the present invention will be described in further detail. The polysulfone polymer used for the cation exchanger of the present invention may be any polysulfone polymer so far as it contains at least one mercapto group per molecule. As such a polysulfone polymer, an aromatic polythioethersulfone, an aromatic polysulfone or an aromatic polysulfone/aromatic thioethersulfone copolymer, may be mentioned.

The above aromatic polythioethersulfone may be obtained by a process disclosed in e.g. Japanese Unexamined Patent Publication No. 13347/1972 or Japanese Examined Patent Publication No. 25879/1978 or No. 25880/1978. The polythioethersulfone has excellent moldability, but is inadequate in its mechanical properties, particularly in the impact strength On the other hand, the aromatic polysulfone has excellent mechanical properties, but is inadequate in the moldability. Accordingly, it is preferred to employ an aromatic polysulfone/polythioethersulfone copolymer of the formula:

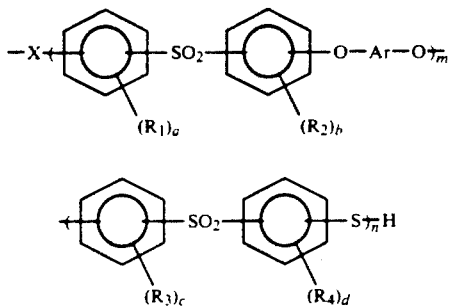

wherein Ar is

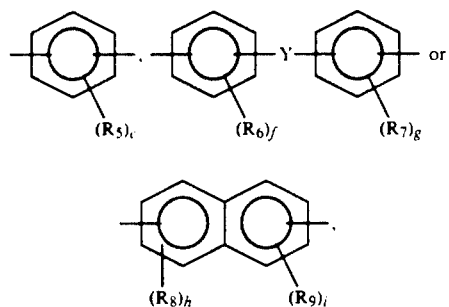

Y is a single bond, —O—, —S—, —SO$_2$—,

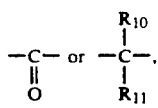

each of $R_1$ to $R_9$ which may be the same or different, is a hydrocarbon group having from 1 to 8 carbon atoms, each of a to d is an integer of from 0 to 4, e is an integer of from 0 to 3, (f+g) is from 0 to 7, (h+i) is from 0 to 5, each of $R_{10}$ and $R_{11}$ is a hydrogen atom or a hydrocarbon group having from 1 to 6 carbon atoms, X is a halogen atom or —SH, and m/n=100/1- 1/10, in view of the moldability and mechanical strength. Such a copolymer can be obtained by a process disclosed in Japanese Unexamined Patent Publications No. 72020/1986, No. 76523/1986 and No. 168629/1986 by the present applicants.

The cation exchanger of the first embodiment of the present invention may be obtained by the following methods:

(1) A method wherein the above polysulfone polymer is molded, then cured and sulfonated;
(2) A method wherein the above polysulfone polymer is molded, then sulfonated and cured; and
(3) A method wherein the above polysulfone polymer is sulfonated, then molded and cured. The method (3) is preferred, since the sulfonation reaction and the curing reaction can thereby be easily controlled.

For the sulfonation of the polysulfone polymer, it is possible to employ a method wherein a solid polysulfone polymer and a sulfonating agent are contacted. However, it is preferred to have the reactants dissolved in a solvent which is stable against the sulfonating agent and capable of dissolving the polysulfone and to have them reacted in a liquid state. As such a solvent, a halogenated hydrocarbon such as trichloroethane or tetrachloroethane may be used.

As the sulfonating agent, concentrated sulfuric acid, fuming sulfuric acid, chlorosulfonic acid, sulfuric anhydride or a sulfuric anhydride triethylphosphate complex may be preferably used without any particular restriction.

Thus, it is possible to obtain a sulfonated polysulfone polymer having a desired ion exchange capacity by adding a sulfonating agent to the polysulfone solution and properly selecting the reaction temperature and the reaction time. If the ion exchange capacity is less than 0.5 meq/g dry resin, the membrane resistance tends to be extremely high. On the other hand, if it exceeds 3.5 meq/g dry resin, a large amount of a curing agent is required, and consequently, the ion exchange capacity of the cured membrane tends to be low, and the mechanical strength, particularly the toughness, of the resulting membrane tends to be low. Therefore, it is preferred to conduct the reaction so that the ion exchange capacity will be from 0.5 to 3.5 meq/g dry resin, preferably from 0.8 to 3.0 meq/g dry resin.

The cation exchanger of the first embodiment of the present invention may be molded directly into membranes or hollow fibers. However, it is preferred to add a curing agent to improve the water absorptivity and the mechanical strength of the molded product with a view to obtaining an ion exchange membrane having excellent ion permselectivity and chemical resistance.

As such a curing agent, any curing agent may be used so long as it is capable of reacting with the functional group contained in the polysulfone to form a stable cross linked structure. It is particularly preferred to employ a curing agent capable of reacting with the mercapto (—SH) group at the terminals of the polysulfone molecules, whereby a highly polymerized or cross linked cured product can be obtained without impairing the mechanical properties of the polysulfone resin.

Such a curing agent includes an epoxy compound having at least two epoxy groups, an aminoplast resin, a metal acetylacetonate, a compound having at least two isocyanate groups, a halide of a metal of Group VIII or IB of the periodic Table and a polyfunctional maleimide compound having at least two maleimide groups. Typical examples of specific compounds for such a curing agent, include bisphenol A diglycidyl ether, N,N,N',N'-tetraglycidyldiaminodiphenylmethane, a novolak type epoxy resin, hexamethdxymethylmelamine, tetramethoxymethylbenzoguanamine, tetramethoxymethylurea, Fe (acetylacetonate)$_3$, Co (ethylacetonate)$_2$, an isocyanulate-modified hexamethylene diisocyanate, a trimethylolpropane-modified hexamethylene diisocyanate, FeCl₃, CuCl₂ and bismaleimide. Thus, from 0.1 to 100 parts by weight, preferably from 0.5 to 50 parts by weight of the curing agent is mixed to 100 parts by weight of the sulfonated polysulfone polymer. As a mixing method, it is preferred to dissolve the polymer and the curing agent in a common solvent with a view to obtaining a uniform mixture and in view of the subsequent molding operation.

The blend of the sulfonated polysulfone and the curing agent may be molded by heat compression molding or by extrusion molding. However, it is preferred to conduct the molding by casting a solution containing the sulfonated polysulfone and the curing agent, since it is thereby possible to produce various types of molded products. As such a solution, a solution having a concentration of from 0.1 to 30% by weight, preferably from 1 to 20% by weight, is used. As the solvent, a polar solvent such as dimethyl acetamide, dimethyl formamide, dimethyl sulfoxide, triethyl phosphate or N-methylpyrrolidone, may be used.

Such a polymer solution is cast in a desired shape, followed by rexloval of the solvent to obtain a molded product in the form of e.g. a flat membrane, a hollow fiber or a laminated membrane with a porous base material.

When the solvent is removed by heat treatment, it is possible to obtain a molded product having a dense structure. On the other hand, it is possible to obtain a molded product having a porous structure by the immersion in the state where the solvent still remains, in a solution capable of extracting the solvent, preferably in a solution using non or a poor solvent to the polymer.

The molded product thus obtained is heated at a temperature of from 200° to 350° C., preferably from 240° to 320° C. to let the polymer and the curing agent react so that it is converted to a cured product insoluble in the solvent. Then, the cured product is treated with a suitable solution such as an aqueous sodium chloride solution to hydrate the ion exchange groups, so that it can be used as a membrane for electrodialysis, as a separator for an electric cell or as a separating membrane such as for diffusion dialysis.

In a second embodiment, the present invention provides a cation exchanger consisting essentially of a sulfonated product of a polysulfone polymer containing at least one chloromethyl (—CH₂Cl) group per molecule, or a cured product thereof, and having an ion exchange capacity of from 0.5 to 3.5 meq/g dry resin.

As mentioned above, the conventional sulfonated polysulfone polymers are not cross-linked and tend to be water-soluble polymers when the ion exchange capacity exceeds 2.0 meq/g dry resin, and even if the ion exchange capacity is not higher than 2.0 meq/g dry resin, e g. at a level of 1.0 meq/g dry resin, they have high water absorptivity and consequently have a low fixed ion concentration in the membranes, whereby the permselectivity is low.

Whereas, the cation exchanger of the present invention using a polysulfone polymer containing ar least one chloromethyl group in its molecule, has excellent mechanical properties, moldability and ion exchange properties.

As the cation exchanger of the second embodiment of the present invention, any polysulfone polymer may be used so long as it contains at least one chloromethyl group per molecule.

The polysulfone polymer containing such a chloromethyl group can be obtained by contacting a polymer containing an aromatic polysulfone of the formula:

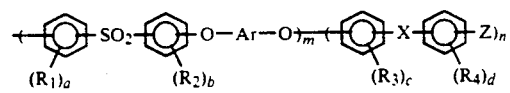

wherein Ar is

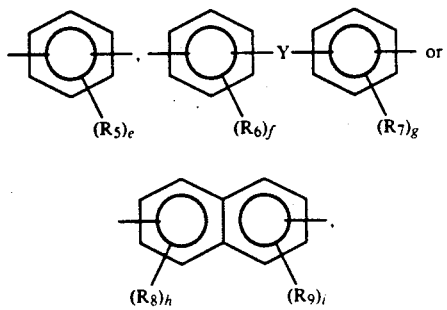

each of X, Y and Z which may be the same or different, is a single bond, —O—, —S—, —SO₂—,

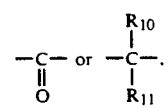

each of $R_1$ to $R_9$ which may be the same or different, is a hydrocarbon group having from 1 to 8 carbon atoms, each of a to d is an integer of from 0 to 4, e is an integer of from 0 to 3, (f+g) is from 0 to 7), (h+i) is from 0 to 5, each of $R_{10}$ and $R_{11}$ is a hydrogen atom or a hydrocarbon group having from 1 to 6 carbon atoms, and m/n=100/0−1/100, with a chloromethylating agent such as chloromethyl methyl ether, 1,4-bis(-chloromethxy)butane, 1-chloromethoxy-4-chlorobutane or a nucleophilic chloromethylating agent such as formalin-hydrogen chloride or parafromaldehyde-hydrogen chloride in the presence of a catalyst.

Such a polysulfone polymer may be a polysulfone polymer of the formula (a), (b) or (c):

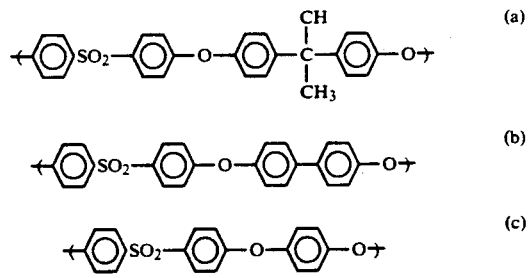

or a block copolymer of the above polysulfone unit with other unit such as the following unit (d) to (h):

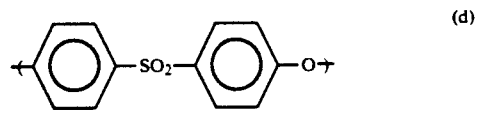

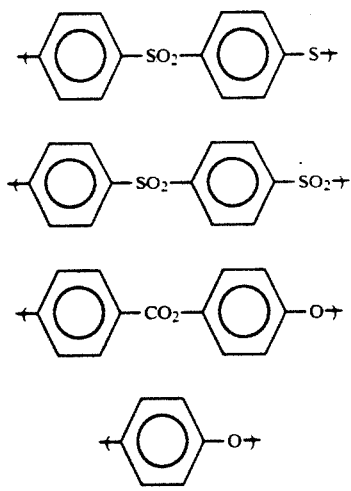

According to the present invention, it is possible to obtain a cation exchange membrane providing excellent performance than ever by using the polysulfone (a) which is readily available as a commonly employed polysulfone. However, it is preferred to use a polysulfone block copolymer in view of the mechanical properties of the sulfonated polymer thereby obtained and the easiness in the control of the ion exchange capacity.

The reason why the block copolymer provides excellent mechanical properties, has not yet been clearly understood, but may be explained as follows.

In the present invention, the presence of the chloromethyl group is necessary to cross-link the polymer and thereby to reduce the water absorptivity of the ion exchanger and to improve the permselectivity. However, by the cross linking, the polymer is more or less prevented from the molecular motion or from swelling upon absorption of water, whereby the internal strain of the polymer increases. Therefore, when the polysulfone homopolymer is used, such action prevails throughout the molecules, whereby the polymer tends to be hard and brittle. However, in the block copolymer, the existence of the segments in which chloromethyl group as an ion exchange group and as a cure site, is not present or very little, whereby the excellent mechanical properties specific to the polysulfone polymer may not be impaired.

In the present invention, an aromatic polysulfone/polythioethersulfone copolymer comprising units (a) to (c) and units (e) may, for example, be mentioned as a preferred block copolymer, since such a copolymer has a high molecular weight, and the composition of the copolymer can easily be controlled, and it provides excellent moldability, mechanical strength and chemical resistance.

For the introduction of the chloromethyl group to the above polysulfone polymer, a method may be used in which a granular polymer or a molded product in the form of a membrane is contacted with the above mentioned chloromethylating agent. However, from the view point of the uniformity of the reaction and with a view to obtaining to a polymer having good moldability, it is preferred to dissolve the reactants in a solvent which is stable against the chloromethylating agent and capable of dissolving the polysulfone polymer and to conduct the reaction in a liquid state. As such a solvent, a halogenated hydrocarbon such as trichloroethane or tetrachloroethane, may be employed.

Thus, it is possible to obtain a chloromethylated polysulfone polymer having a desired content of chloromethyl groups by adding a chloromethylating agent and a catalyst such as tin chloride to a polysulfone polymer solution and properly selecting the reaction temperature and the reaction time.

The content of chloromethyl groups varies depending upon the desired ion exchange capacity in the subsequent sulfonation treatment. It is usually preferred to use a chloromethylated polysulfone polymer having an content of chloromethyl groups of from 0.01 to 3.5 meq/g dry resin, which contains chloromethyl groups in an amount corresponding to from 1 to 100% equivalent of the ion exchange capacity, more preferably from 5 to 50% equivalent of the ion exchange capacity.

The chloromethylated polysulfone polymer thus obtained is then dissolved in a single solvent such as trichloroethane, tetrachloroethane, dimethylacetamide, dimethylformamide, dimethylsulfoxide, triethylphosphate or N-methylpyrrolidone, or in a solvent mixture such as a water-acetone mixture, a methanol tetrahydrofuran mixture, and then cast into a desired shape, followed by drying to obtain a molded product. It is also possible to incorporate a Lewis acid such as $SnCl_4$, $ZnCl_4$ or $H_2SO_4$ to said solution and to cross-link the chloromethyl group during the casting, drying and molding.

The molded product of the chloromethylated polysulfone polymer or the cross-linked product thereof, thus obtained, may be sulfonated by a known sulfonating agent. However, when the molded product is not crosslinked, sulfonation and a cross linking reaction may be carried out simultaneously by concentrated sulfuric acid to obtain the cation exchanger of the present invention.

In another embodiment, the present invention provides a cation exchanger consisting essentially of a polymer obtained by mixing the above-mentioned chloromethylated polysulfone polymer and a sulfonated product of the same or different polysulfone polymer in the presence of a Lewis acid.

As such a Lewis acid, the ion exchange group of the sulfonated polysulfone polymer in the form of $-SO_3H$ may be used. Thus, a cured product insoluble in a solvent can be obtained simply by casting a mixture of the chloromethylated polysulfone polymer and the sulfonated polysulfone polymer, such as a solution mixture of the two polymers in a polar solvent such as dimethylacetamide, dimethylformamide or dimethylsulfoxide as the common solvent, then drying it to obtain a molded product, and heating the molded product at a temperature of from 180° to 300° C., preferably 220° to 250° C.

The cation exchanger of the present invention may be treated in a suitable solution such as an aqueous sodium chloride solution to hydrate ion exchange groups and then used. The cation exchanger of the present invention in the form of a membrane having a thickness of not more than 100 μm, may be used as a membrane for electrodialysis, as a separator for electric cells or as a separating membrane such as for diffusion dialysis.

Now, the present invention will be described in further detail with reference to Examples. However, it should be understood that the present invention is by no means restricted by such specific Examples.

EXAMPLE 1

In the same manner as the synthesis disclosed in Japanese Unexamined Patent Publication No. 168629/1986, 4,4'-diphenol and a dihalodiphenylsulfone were reacted to obtain a precursor comprising aromatic polysulfone units. Then, the precursor, a dihalodiphenylsulfone and sodium sulfide were reacted to obtain an aromatic polysulfone/polythioethersulfone copolymer A of the formula:

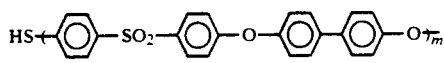

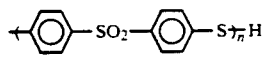

m/n = 1/1

Intrinsic viscosity: 0.65

Then, the copolymer A was dissolved in 1,1,2-trichloroethane and then reacted with a trichloroethane solution containing a complex of sulfuric anhydride triethylphosphate in a molar ratio of 2/1 at 25° C., for 100 hours so that one unit of the copolymer A is contacted with two equivalents of the complex. Then, the reaction solution was neutralized with sodium hydroxide, washed and dried. The obtained sulfonated copolymer A had an ion exchange capacity of 2.05 meq/g dry resin.

100 parts by weight of the sulfonated copolymer A thus obtained and 25 parts by weight of hexamethoxymethylmelamine were dissolved in N-methylpyrrolidone to obtain a solution having a solid content of 20% by weight. Then, the polymer solution was cast on a glass sheet, dried and heat-treated at 300° C. for one hour to obtain a membrane having a thickness of 25 $\mu$m.

The membrane thus obtained was immersed in a 0.5N NaCl solution, and then the alternating current resistance and the transport number of Na ions by a membrane potential method were obtained.

Alternate current resistance
(0.5N NaCl 100Hz): 0.4 $\Omega\cdot cm^2$

Na+ transport number
(0.5M NaCl/,1M NaCl membrane potential): 0.90

EXAMPLE 2

In the same manner as in Example 1, the aromatic polysulfone/polythioethersulfone copolymer A and the sulfuric anhydride/triethylphosphate complex were reacted at 25° C. for 43 hours to obtain a sulfonated copolymer (hereinafter referred to as copolymer A2) having an ion exchange capacity of 1.85 meq/g dry resin.

N-methylpyrrolidone solutions were prepared by changing the proportions of the above copolymer A2 and hexamethoxymethylmelamine. In the same manner as in Example 1, cation exchange membranes having a thickness of 25 $\mu$m were prepared. The N-methylpyrrolidone solvent resistance and the film properties of each membrane are shown in Table 1.

TABLE 1

| Run-No. | Hexamethyloxy-methylmelamine Copolymer A2 100 parts | N-methyl-pyrrolidone solvent resistance | Alternating current resistance ($\Omega \cdot cm^2$) | Na ion transport number (Membrane potential method) |
|---|---|---|---|---|
| 1 | 0 | Dissolved | 0.33 | 0.83 |
| 2 | 5 parts | Jellied | 0.42 | 0.89 |
| 3 | 10 parts | Jellied | 0.46 | 0.92 |
| 4 | 25 parts | 500% swelled | 0.50 | 0.94 |
| 5 | 50 parts | 100% swelled | 1.00 | 0.94 |

EXAMPLE 3

The aromatic polysulfone/polythioethersulfone copolymer A obtained in Example 1 was sulfonated to obtain a sulfonated copolymer A3 having an ion exchange capacity of 0.6 meq/g dry resin, a sulfonated copolymer A4 having an ion exchange capacity of 1.0 meq/g dry resin and a sulfonated copolymer A5 having an ion exchange capacity of 2.35 meq/g dry resin.

100 parts by weight of the copolymer and 10 parts by weight of hexamethoxymethylmelamine were dissolved in N-methylpyrrolidone. In the same manner as in Example 1, a cation exchange membrane having a thickness of 25 $\mu$m was obtained. The N-methylpyrrolidone solvent resistance and the film properties of each membrane are shown in Table 2.

TABLE 2

| Sulfonated copolymer (Ion exchange capacity) | N-methyl-pyrrolidone solvent resistance | Alternating current resistance ($\Omega \cdot cm^2$) | Na ion transport number (Membrane potential method) |
|---|---|---|---|
| Copolymer A3 (0.6) | 110% swelled | 4.0 | 0.96 |
| Copolymer A4 (1.0) | 800% swelled | 2.2 | 0.95 |
| Copolymer A5 (2.35) | Dissolved | 0.2 | 0.82 |

EXAMPLE 4

In the same manner as the synthesis disclosed in Japanese Unexamined Patent Publication No. 168629/1986, bisphenol A and a dihalodiphenylsulfone were reacted to obtain a precursor comprising aromatic polysulfone units. Then, the precursor, a dihalodiphenylsulfone and sodium sulfide were reacted to obtain an aromatic polysulfone/polythioethersulfone copolymer B of the formula:

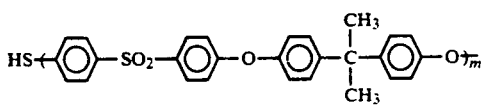

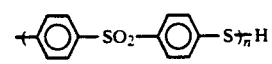

m/n = 10/1

Intrinsic viscosity: 0.60

Then, the above copolymer B was reacted with the sulfuric anhydride/triethylphosphate complex in the same manner as in Example 1 for sulfonation to obtain a sulfonated copolymer B having an ion exchange capacity of 2.50 meq/g dry resin. Then, 100 parts by weight of the sulfonated copolymer B of sodium salt type and 25 parts by weight of hexamethoxymethylmelamine were dissolved in N-methylpyrrolidone. The solution was cast on a glass sheet and heat-treated at 300° C. to obtain a cation exchange membrane having a thickness of 25 μm. The alternating current resistance of the membrane in a 0.5N NaCl solution was 0.2 Ω·cm², and the Na ion transport number was 0.84. No change in the membrane form was observed even when the membrane was boiled in pure water.

COMPARATIVE EXAMPLE 1

Bisphenol A and a dihalodiphenylsulfone were reacted, to obtain an aromatic polysulfone polymer C.

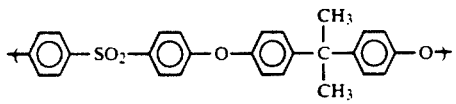

Intrinsic viscosity: 0.56

Then, the above polymer C was sulfonated with the sulfuric anhydride/triethylphosphate complex at 25° C. for 60 hours in the same manner as in Example 1 to obtain a sulfonated polymer C having an ion exchange capacity of 2.4 meq/g dry resin.

Then, in the same manner as in Example 4, a cation exchange membrane having a thickness of 25 μm was obtained from a solution comprising 100 parts by weight of the sulfonated polymer C of sodium salt type and 25 parts by weight of hexamethoxymethylmelamine. The membrane was immersed in a 0.5N NaCl solution, and it was attempted to measure the resistance, but the membrane raptured during the handling. The membrane was boiled in pure water, whereby the sulfonated copolymer C was dissolved and disintegrated.

EXAMPLE 5

The polymer C obtained from bisphenol A and a dihalodiphenylsulfone, used in Comparative Example 1, was dissolved in 1,1,2,2-tetrachloroethane. Then, chloromethyl methyl ether and anhydrous tin chloride were added thereto. The mixture was reacted at 50° C. for 4 hours and then precipitated with methyl alcohol. The precipitates were washed to obtain a chloromethylated copolymer C wherein the chloromethyl group content was 1.2 meq/g dry resin.

The chloromethylated copolymer C thus obtained was dissolved in tetrachloroethane to obtain a 10 wt % solution. Then, the polymer solution was cast on a glass sheet and then dried under heating at 150° C. for two hours to obtain a cast membrane having a thickness of 25 μm.

Then, the cast membrane of the chloromethylated copolymer C was sulfonated with 98% by weight of concentrated sulfuric acid at 90° C. to obtain a cation exchange membrane.

The cation exchange membrane thus obtained had an ion exchange capacity of 2.1 meq/g dry resin. The alternating current resistance in 0.5N NaCl was 0.1 Ω·cm², and the Na ion transport number was 0.78.

COMPARATIVE EXAMPLE 2

A cast membrane of the copolymer C was obtained in the same manner as in Example 5 except that no chloromethylating reaction was conducted.

Then, the cast membrane was sulfonated with 98 wt % concentrated sulfuric acid. However, the membrane was dissolved, and no cation exchange membrane was obtained.

EXAMPLE 6

The copolymer A as used in Example 1 was treated in the same manner as in Example 5 to obtain a cast membrane of a chloromethylated copolymer A1 having a thickness of 25 μm wherein the content of chloromethyl groups was 0.5 meq/g dry resin.

Then, the cast membrane of the chloromethylated copolymer A1 was sulfonated in the same manner as in Example 5 to obtain a cation exchange membrane.

The cation exchange membrane thus obtained had an ion exchange capacity of 1.5 meq/g dry resin. The alternating current resistance in 0.5N NaCl was 0.3 Ω·cm², and the Na ion transport number was 0.90.

EXAMPLE 7

A chloromethylated copolymer A2 was obtained in the same manner as in Example 5 except that the copolymer A as used in Example 1 was chloro-methylated at 108° C. for 4 hours. The chloromethyl group content of the chloromethylated copolymer A2 was 2.2 meq/g dry resin.

On the other hand, a sulfonated copolymer A having an ion exchange capacity of 2.05 meq/g dry resin was obtained in the same manner as in Example 1 except that no neutralization treatment was conducted.

Then, 75 parts by weight of the sulfonated copolymer A thus obtained and 25 parts by weight of the above-mentioned chloromethylated copolymer A2 were dissolved in N-methylpyrrolidone to obtain a solution having a solid concentration of 20% by weight. Then, the polymer solution was cast on a glass sheet and heat-treated at 260° C. for one hour to obtain a cation exchange membrane having a thickness of 25 μm.

With the membrane thus obtained, the alternating current resistance in a 0.5N NaCl solution was 0.5 Ω·cm², and the Na+ transport number was 0.95.

Then the membrane was immersed in N-methylpyrrolidone, but did not dissolve.

EXAMPLE 8

A cation exchange membrane was obtained in the same manner as in Example 7 except that the sulfonated copolymer was neutralized to a sodium type.

With the membrane thus obtained, the alternating current resistance in a 0.5N NaCl solution was 0.5 Ω·cm², and the Na+ transfer number was 0.94.

The membrane was immersed in N-methylpyrrolidone, whereby it was dissolved.

EXAMPLE 9

An aqueous isopropyl alcohol solution was added to an N-methylpyrrolidone solution containing 100 parts by weight of the sulfonated copolymer A obtained in Example 1 and 25 parts by weight of hexamethoxymethylmelamine and having a solid content concentration of 20% by weight, to obtain a solution having a surface tension of not higher than 28 dyne/cm. The solution was coated on a porous body of polytetrafluoroethylene having a pore diameter of 0.2 μm, a porosity of 80% and membrane thickness of 20 μm and heat-treated at 300° C. for one hour to obtain a composite membrane having a deposition of 2 g/m². The alternating current resistance of the membrane in a 0.5N NaCl solution was 0.1 Ω·cm².

The cation exchanger of the present invention is characterized in that it consists essentially of a cross linkable sulfonated polysulfone. Therefore, it is possible to obtain a cation exchange membrane capable of controlling the fixed ion concentration i.e. having an optimum permselectivity depending upon its use, by selecting the type of the curing agent, the amount of the curing agent and the curing conditions. Further, the resistance against an organic solvent can be improved.

Especially when an aromatic polysulfone/polythioethersulfone copolymer is employed, a cation exchange membrane having excellent moldability and mechanical strength can be obtained. Further, during the sulfonation, sulfonic acid groups are introduced to certain specified sites due to the difference in the reactivity, whereby a block copolymer comprising hydrophilic segments having ion exchange groups introduced and hydrophobic segments having no ion exchange groups introduced may be obtained. There is a feature that even when the ion exchange capacity is high, a tough membrane having high mechanical strength can be obtained.

Further, a membrane may be prepared by casting a solution containing a sulfonated copolymer and a curing agent, whereby a thin ion exchange membrane can be obtained, and by coating on a porous base material or on other polymer membrane, followed by drying, a double layered or composite ion exchange membrane can readily be prepared.

We claim:

1. A cation exchanger of improved mechanical properties of polysulfone polymer consisting essentially of a sulfonated product of a polysulfone polymer having at least one chloromethyl (—CH₂Cl) group per molecule, and having an ion exchange capacity of from 0.5 to 3.5 meq/g dry resin, said polysulfone polymer being an aromatic polysulfone/polythioethersulfone polymer of inherent viscosity of 0.1 to 1.5, of the formula:

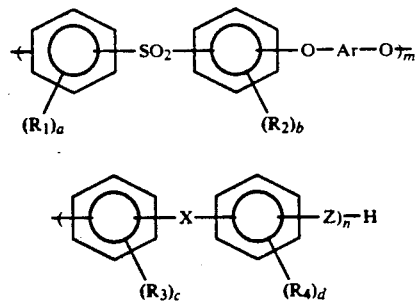

wherein Ar is

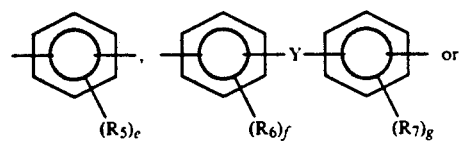

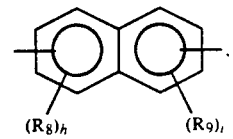

each of X, Y and Z is a single bond,

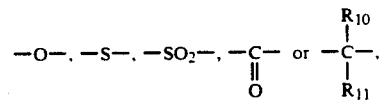

each of $R_1$ to $R_9$ which may be the same or different, is a hydrocarbon group having from 1 to 8 carbon atoms, each of a to d is an integer of from 0 to 4, e is an integer of from 0 to 3, (f+g) is from 0 to 7, (h+i) is from 0 to 5), each of $R_{10}$ and $R_{11}$ is a hydrogen atom or a hydrocarbon group having from 1 to 6 carbon atoms, and m/n = 100/1 – 1/10, said polysulfone polymer having a content of chloromethyl groups of from 0.01 to 3.0 meq/g dry resin.

2. The cation exchanger according to claim 1, wherein polysulfone polymer is an aromatic polysulfone/polythioethersulfone polymer of the formula:

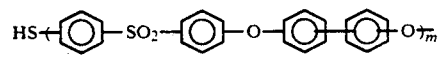

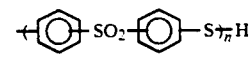

wherein m/n = 10/1 – 1/5.

3. The cation exchanger according to claim 1, wherein the polysulfone polymer is an aromatic polysulfone/polythioethersulfone polymer of the formula:

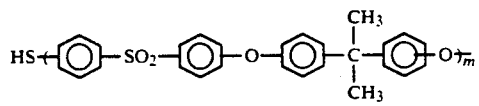

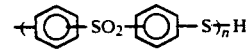

wherein m/n = 10/1 – 1/5.

4. The cation exchanger according to claim 1, wherein the polysulfone polymer is a chloromethylated polysulfone polymer of the formula:

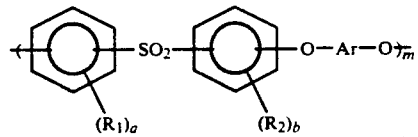

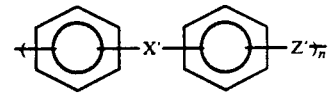

wherein Ar is as defined above, each of X' and Z' has the same meaning as the definition of Ar, and m/n = 100/0 − 1/100.

5. The cation exchanger according to claim 1, wherein the polysulfone polymer is an aromatic polysulfone/polythioether sulfone polymer of the formula:

[chemical structure]

wherein Ar is

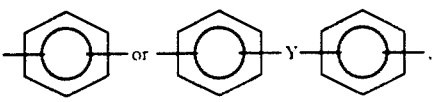

Y is a single bond or

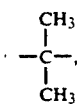

m/n = 10/1 − 1/5.

6. The cation exchanger according to claim 1, which is a cation exchange membrane obtained by sulfonating in concentrated sulfuric acid a membrane obtained by casting a solution containing a chloromethylated polysulfone polymer, followed by heat treatment, and having a membrane thickness of 100 μm.

* * * * *